(12) United States Patent
Janssens

(10) Patent No.: US 6,375,155 B1
(45) Date of Patent: Apr. 23, 2002

(54) DEVICE FOR CLOSING PIPES

(75) Inventor: Henri Bertha Karel Janssens, Hove (BE)

(73) Assignee: Stuvex International N.V., Kontich (BE)

(*) Notice: Subject to any disclaimer, the term of this patent is extended or adjusted under 35 U.S.C. 154(b) by 0 days.

(21) Appl. No.: 09/556,085

(22) Filed: Apr. 21, 2000

(30) Foreign Application Priority Data

Apr. 23, 1999 (BE) .............................. 9900297

(51) Int. Cl.⁷ ................................. F16K 3/03
(52) U.S. Cl. ..................................... 251/212
(58) Field of Search ........................ 251/212

(56) References Cited

U.S. PATENT DOCUMENTS

| | | | |
|---|---|---|---|
| 1,999,699 A | * 4/1935 | Koch | 251/212 X |
| 2,649,272 A | * 8/1953 | Barbato | 251/212 |
| 3,101,736 A | * 8/1963 | Egger | 251/212 X |
| 4,094,492 A | * 6/1978 | Beeman et al. | 251/212 |
| 4,095,514 A | * 6/1978 | Roy et al. | 251/212 X |
| 4,513,948 A | * 4/1985 | Konig | 251/212 |
| 5,549,086 A | * 8/1996 | Ozawa et al. | 123/193.6 |
| 5,802,716 A | * 9/1998 | Nishimura et al. | 29/888.06 |
| 5,975,493 A | * 11/1999 | Ellingson et al. | 251/212 |
| 5,993,978 A | * 11/1999 | Kim et al. | 428/553 |

FOREIGN PATENT DOCUMENTS

| | | |
|---|---|---|
| CH | 637 457 | 7/1983 |
| DE | 1 042 323 | 10/1958 |
| GB | 579471 | 8/1946 |
| GB | 607866 | 9/1948 |
| WO | WO 97/14938 | 4/1997 |

\* cited by examiner

*Primary Examiner*—John Kwon
*Assistant Examiner*—Eric Keasel
(74) *Attorney, Agent, or Firm*—Joan H. Pauly

(57) ABSTRACT

A device for closing pipes, in particular conveyor pipelines for gas or fluid media, which device comprises an annular carrier extending transversely of the passage of the pipe for a number of plates supported pivotally relative to the side wall of the carrier, in addition to a control ring which is arranged coaxially of the annular carrier and which is in engagement with all plates, which control ring and carrier are rotatable relative to each other on the common central axis thereof such that the plates are movable from a first position, wherein the passage is left clear, to a second position wherein the passage is closed, and vice versa, wherein each plate takes a triangular form, wherein the pivot point with the carrier is arranged outside this triangle, which triangular plates together precisely close the passage.

11 Claims, 3 Drawing Sheets

DEVICE FOR CLOSING PIPES

TECHNICAL FIELD

The invention relates to a device for closing pipes, in particular conveyor pipelines for gas or fluid media, which device, comprises an annular carrier extending transversely of the passage of the pipe for a number of plates supported pivotally relative to the side wall of the carrier, in addition to a control ring which is arranged coaxially of the annular carrier and which is in engagement with all plates, which control ring and carrier are rotatable relative to each other an the common central axis thereof such that the plates are movable from a first position, wherein the passage is left clear, to a second position wherein the passage is closed, and vice versa.

Backgroud Information

Such a device is known by the name of "iris closure" and serves to enable rapid closure of pipelines for transport of gas or a fluid medium. It may be necessary in such pipeline systems to close the passage in the case of accidents, whereby further damage can be prevented. It is therefore necessary to be able to carry out this closure quickly and with sufficient sealing to prevent leakage losses.

Brief Summary of the Invention

The invention has for its object to improve such a closure and provides to this end a device which is distinguished in that each plate takes a triangular form, wherein the pivot point with .the carrier is arranged outside this triangle, which triangular plates together precisely close the passage.

Owing to the pivotable plates it is possible to provide a completely free passage which can be placed rapidly into the closing position by pivoting through an angle of a maximum of only 90°. This can take place in a time period of 0–100 ms.

Above mentioned and other characterizing advantages will be further elucidated hereinbelow with reference to an embodiment as according to the annexed drawing.

DETAILED DESCRIPTION OF THE INVENTION

Figure 1:
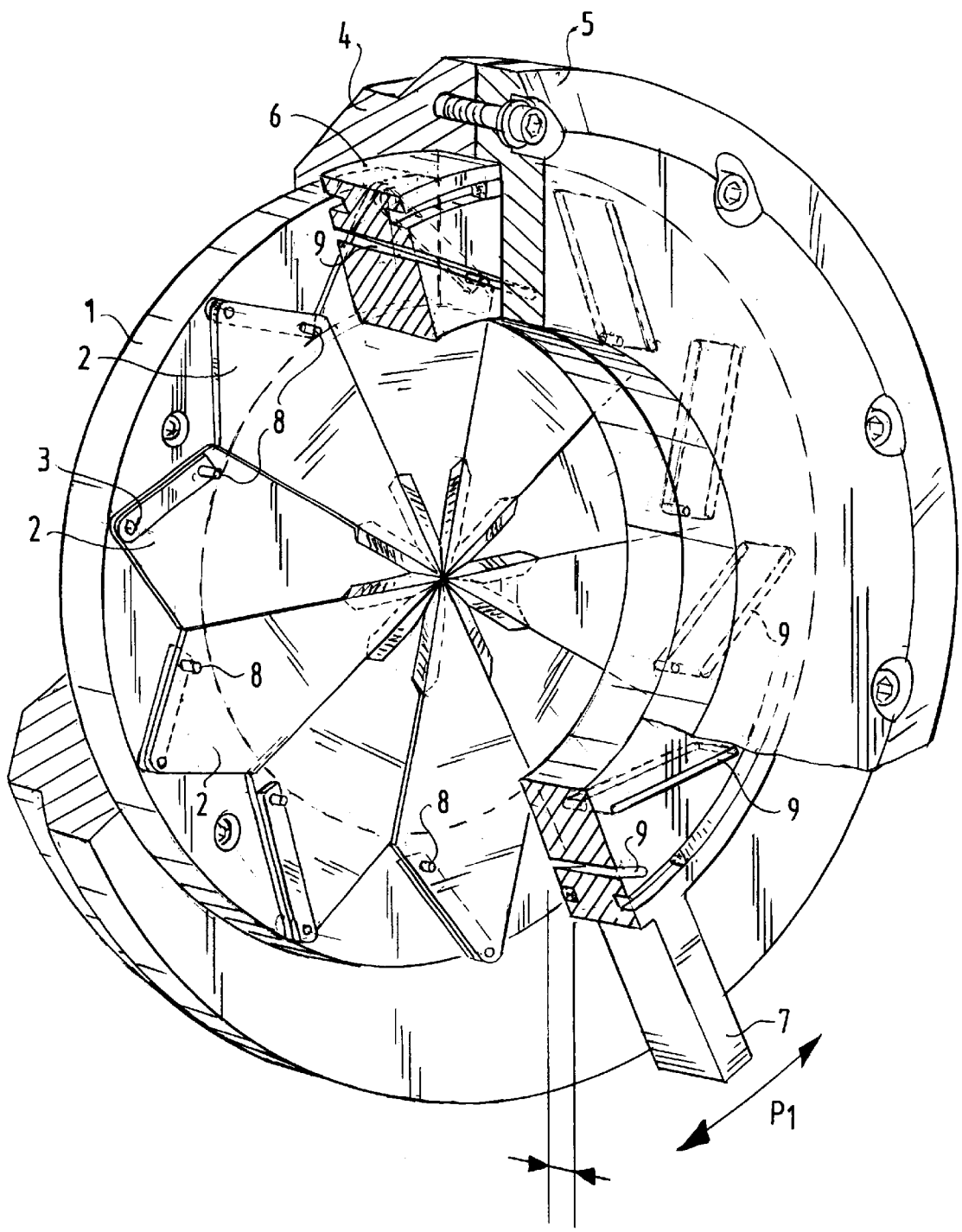
FIG. 1 shows a perspective view of a device according to the invention wherein the plates are in a closed position.

In the figures the reference numeral 1 designates the annular carrier on which plates 2 are pivotally supported at 3. Carrier 1 is received in an annular housing consisting of two parts 4 and 5, which parts are screwed onto each other by means of bolts. Placed adjacently of carrier 1 is an annular control body 6 which is likewise received in the housing formed by the halves 4, 5 and mounted slidably therein. Control ring 6 is provided with an arm 7 which can be displaced reciprocally in the direction of arrow P1, whereby control ring 6 undergoes a determined angular displacement relative to carrier 1. The device according to FIG. 1 is deemed to be accommodated in a pipeline (not shown), whereby the annular passage of housing 4, S is equal to the. passage of the pipeline.

Figure 2:
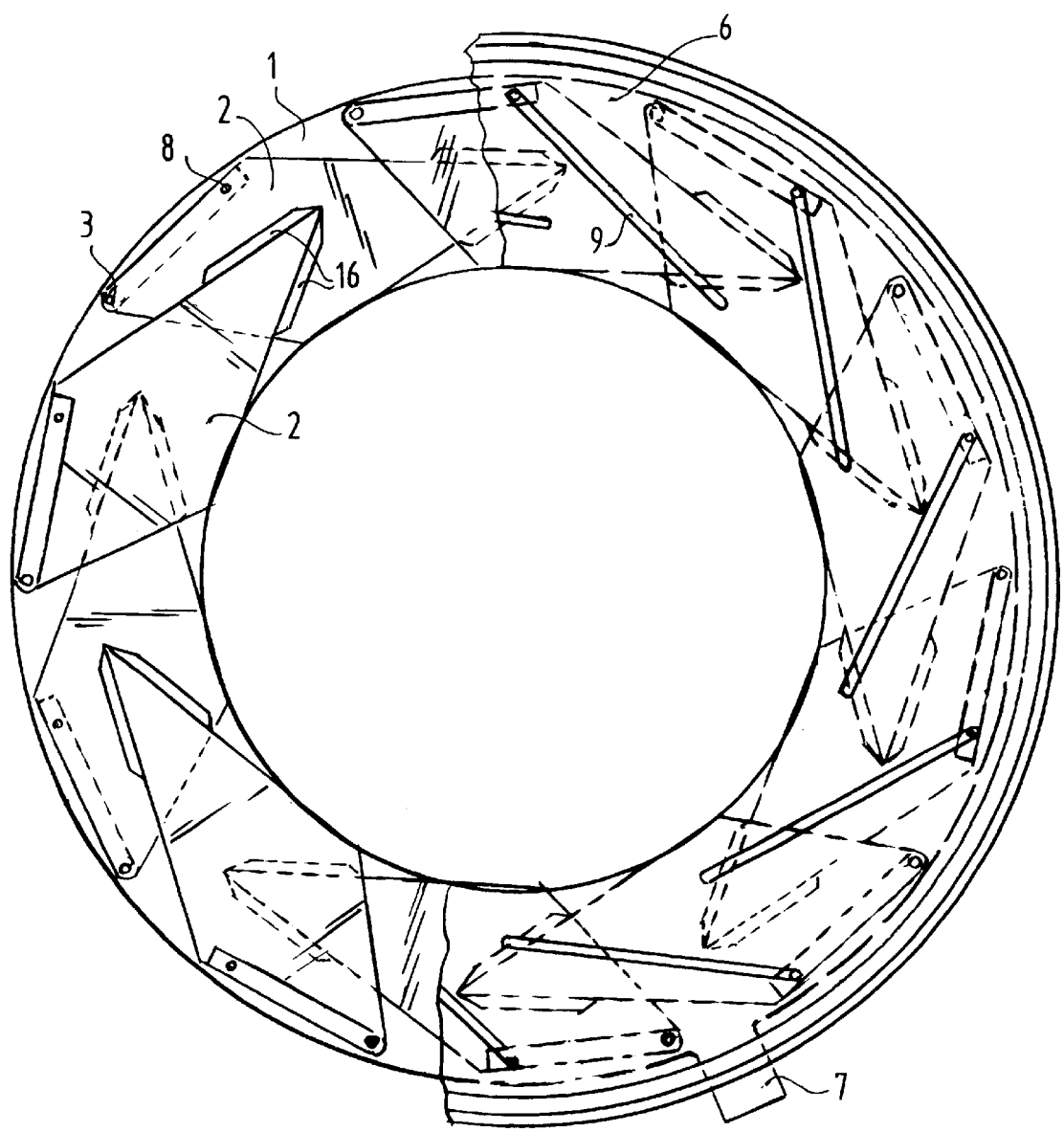
FIG. 2 shows an axial view of the carrier with the plates in the opened position.

It is further noted that plate 2 is provided with a pin 8 which extends at a distance from and parallel to pivot pin 3 and fits into slots 9 recessed in control ring 6 at a determined angle relative to the periphery. The position of pivot pin 3, control pin 8 and slots 9 in control ring 6 is such that as control ring 6 displaces relative to carrier 1 the plates 2 can be swivelled from the closed position of FIG. 1 to the opened position of FIG. 2, and vice versa.

Figure 3:
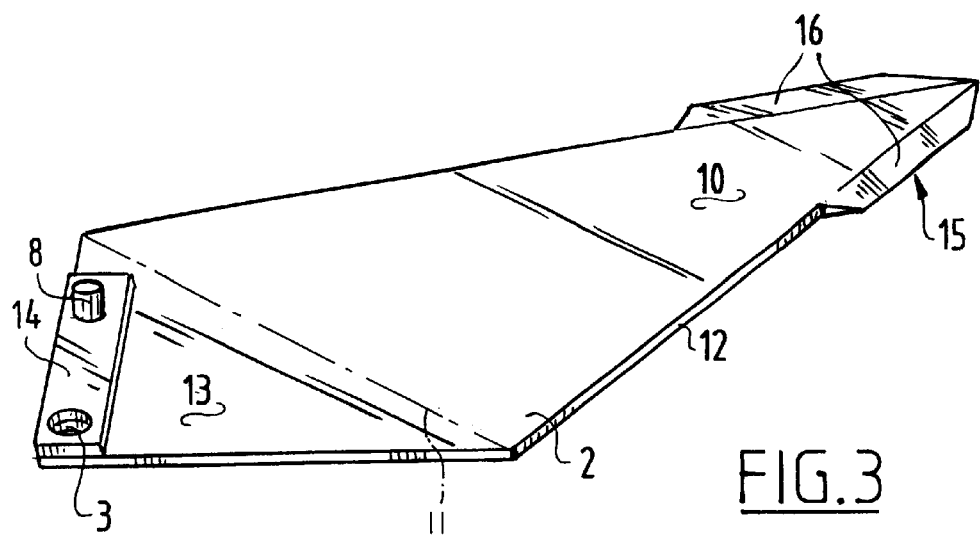
FIG. 3 is a perspective view of a single plate.

FIG. 3 shows a perspective view of a plate. Plate 2 is leaf-shaped and has a substantially triangular form 10 with a base 11, which triangle has isosceles sides 12. The apex angle of triangle 10 is determined by the number of plates placed in the circle.

The pivot point 3 lies outside the first triangle 10 and lies preferably in the apex of a second triangle 13 with the same base 11 and likewise isosceles sides.

A spacer strip 14 is placed along one of the sides, in which case the pin 8 is also arranged. However, in the subsequent plates in the circle round carrier 1 the strip 14 is placed on the front respectively rear side, see FIG. 1. Pin 8 is thus also placed directly on the flat body of the plate.

It is further noted that the apex of the first triangle 10 is provided along the sides with a strip 15 which is chamfered on one face. This chamfering also takes place alternatingly, so that in a closed position the chamfered faces 16 of strip 15 lie against one another, see FIG. 1.

The plates may be surface treated to increase corrosion resistance and decrease friction. To accomplish this, each plate may undergo a surface treatment in a vapour-deposition space with a reagent containing TEFLON (trademark)-nickel-phosphor.

Figure 4:
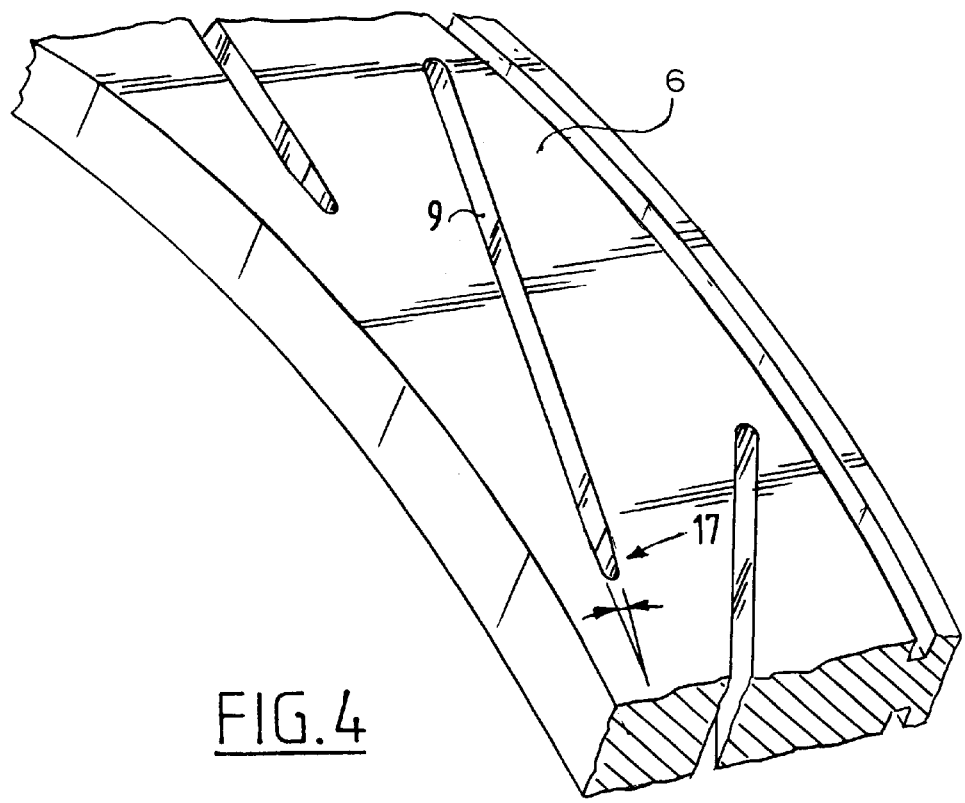
FIG. 4 shows a perspective view of a part of the control ring for the plates.

Finally, it is noted that slots 9 in control ring 6, see FIG. 4, have parallel sides along practically the whole length to enable slidable receiving of the pin 8 of plate 2. The slot will however narrow at one end, see 17, in order to clampingly receive pin 8 without clearance in this position, which corresponds with the closing position of FIG. 1. The plates are thus held firmly in place.

The invention is not limited to the above described embodiment.

What is claimed is:

1. Device for closing a pipe having a passage, said device comprising an annular carrier having a side wall and extending transversely of the passage of the pipe; a plurality of plates each of which is supported to pivot about a pivot point relative to the side wall of the carrier; and a control ring that is arranged coaxially of the annular carrier and that is in engagement with all of said plates; said control ring and said carrier being rotatable relative to each other about a common central axis such that said plates are movable from a first position wherein the passage is left clear, to a second position wherein the passage is closed, and vice versa, characterized in that each plate has a plan form that includes a triangle, wherein said pivot point is located outside said triangle, and said plates engage each other and together precisely close the passage when said plates are in said second position; said triangle is a first triangle, said plan form includes a second triangle, said first and second triangles have a common base, and said pivot point of each said plate is located in said second triangle; and one side of said second triangle of each said plate is provided with a spacer strip, said spacer strips of adjacent plates being alternately provided on a first side of said second triangle and a second opposite side of said second triangle.

2. Device as claimed in claim 1, characterized in that each plate has undergone a surface treatment in a vapour-deposition space with a reagent containing nickel phosphor phosphor in order to increase corrosion resistance and to decrease friction.

3. Device as claimed in claim 1, characterized in that said first triangle is an isosceles triangle having two equal sides meeting at an apex, and at least part of each of said equal sides, starting from said apex, is provided with a chamfered side strip, wherein said chamfered side strips of each said plate are provided on opposite faces of said first triangle, and adjacent side strips of adjacent plates are provided on opposite faces of said first triangles.

4. Device as claimed in claim 1, characterized in that said control ring is provided with a plurality of slots, one for each said plate, each said slot engaging a pin carried by the corresponding plate, and each said slot being convergent at an end thereof corresponding with a position of said pin of the corresponding plate when the corresponding plate is in said second position.

5. Device as claimed in claim 4, characterized in that each plate has undergone a surface treatment in a vapour-deposition space with a reagent containing nickel-phosphor in order to increase corrosion resistance and to decrease friction.

6. Device as claimed in claim 1, characterized in that said first triangle is an isosceles triangle having two equal sides meeting at an apex, and at least part of each of said equal sides, starting from said apex, is provided with a chamfered side strip, wherein said chamfered side strips of each said plate are provided on opposite faces of said first triangle, and adjacent side strips of adjacent plates are provided on opposite faces of said first triangles.

7. Device as claimed in claim 6, characterized in that each plate has undergone a surface treatment in a vapour-deposition space with a reagent containing nickel-phosphor in order to increase corrosion resistance and to decrease friction.

8. Device as claimed in claim 6, characterized in that said control ring is provided with a plurality of slots, one for each said plate, each said slot engaging a pin carried by the corresponding plate, and each said slot being convergent at an end thereof corresponding with a position of said pin of the corresponding plate when the corresponding plate is in said second position.

9. Device as claimed in claim 8, characterized in that each plate has undergone a surface treatment in a vapour-deposition space with a reagent containing nickel-phosphor in order to increase corrosion resistance and to decrease friction.

10. Device for closing a pipe having a passage, said device comprising annular carrier having a side wall and extending transversely of the passage of the pipe; a plurality of plates each of which is supported to pivot about a pivot point relative to the side wall of the carrier; and a control ring that is arranged coaxially of the annular carrier and that is in engagement with all of said plates; said control ring and said carrier being rotatable relative to each other about a common central axis such that said plates are movable from a first position wherein the passage is left clear, to a second position wherein the passage is closed, and vice versa, characterized in that each plate has a plan form that includes a triangle, wherein said pivot point is located outside said triangle, and said plates engage each other and together precisely close the passage when said plates are in said second position; and said control ring is provided with a plurality of slots, one for each said plate, each said slot engaging a pin carried by the corresponding plate, and each said slot narrowing at an end thereof corresponding with a position of said pin of the corresponding plate when the corresponding plate is in said second position, to be convergent at said end to clampingly receive said pin without clearance.

11. Device as claimed in claim 10, characterized in that each plate has undergone a surface treatment in a vapour-deposition space with a reagent containing nickel-phosphor in order to increase corrosion resistance and to decrease friction.

* * * * *